(12) United States Patent
Warke et al.

(10) Patent No.: US 8,693,531 B2
(45) Date of Patent: Apr. 8, 2014

(54) METHOD AND APPARATUS FOR PERFORMING SPECULATIVE DECISION FEEDBACK EQUALIZATION

(75) Inventors: Nirmal C. Warke, Irving, TX (US); Robert F. Payne, Lucas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 259 days.

(21) Appl. No.: 13/278,851

(22) Filed: Oct. 21, 2011

(65) Prior Publication Data

US 2013/0101000 A1 Apr. 25, 2013

(51) Int. Cl.
*H03H 7/30* (2006.01)

(52) U.S. Cl.
USPC ............ 375/232; 375/219; 375/233; 375/285

(58) Field of Classification Search
USPC .......................................... 375/222, 233, 232
See application file for complete search history.

(56) References Cited

U.S. PATENT DOCUMENTS

| | | |
|---|---|---|
| 7,426,236 B1 | 9/2008 | He |
| 7,539,243 B1 | 5/2009 | Toifl et al. |
| 7,561,633 B2 | 7/2009 | Parhi et al. |
| 7,792,187 B2 | 9/2010 | Bulzacchelli |
| 7,822,114 B2 | 10/2010 | Bulzacchelli et al. |
| 8,164,499 B1* | 4/2012 | Booth et al. ................... 341/135 |
| 8,243,782 B2* | 8/2012 | Mobin et al. ................... 375/233 |
| 2004/0203559 A1 | 10/2004 | Stojanovic et al. |
| 2007/0274628 A1 | 11/2007 | Hayee et al. |
| 2008/0187036 A1 | 8/2008 | Park et al. |
| 2009/0285277 A1 | 11/2009 | Sunaga et al. |
| 2009/0304066 A1 | 12/2009 | Chmelar et al. |
| 2010/0054324 A1 | 3/2010 | Bulzacchelli et al. |
| 2010/0260253 A1 | 10/2010 | Hovakimyan et al. |
| 2010/0284686 A1* | 11/2010 | Zhong ............................... 398/1 |
| 2012/0072784 A1* | 3/2012 | Li et al. .......................... 714/704 |
| 2012/0207196 A1* | 8/2012 | Zerbe et al. .................... 375/219 |
| 2012/0300831 A1* | 11/2012 | Luo et al. ....................... 375/233 |

OTHER PUBLICATIONS

"An Adaptive 4-Pam Decision-Feedback Equalizer for Chip-To-Chip Signaling," IEEE Intl. SOC Conf. Proceedings, Sep. 12-15, 2004, pp. 297-300 (Marcus van Ierssel, Joyce Wong, AU Sheikholeslami).

* cited by examiner

*Primary Examiner* — Eva Puente
(74) *Attorney, Agent, or Firm* — John R. Pessetto; Wade J. Brady, III; Frederick J. Telecky, Jr.

(57) ABSTRACT

A method for equalizing a received signal is provided. The signal is filtered and transmitted over a channel using an encoding scheme, where the encoding scheme has transmit symbols. This transmitted signal is then shaped such that the filtering and equalization adjust a set of taps in an equalization window so that the taps from the set are substantially equal to one another. Inter-symbol interference is then compensated for in the equalized signal using a speculative DFE with significantly reduced comparator levels.

19 Claims, 5 Drawing Sheets

METHOD AND APPARATUS FOR PERFORMING SPECULATIVE DECISION FEEDBACK EQUALIZATION

TECHNICAL FIELD

The invention relates generally to equalization and, more particularly, to decision feedback equalizers (DFEs).

BACKGROUND

Turning to FIG. 1, an example of a conventional serializer/deserializer (SerDes) link 100 can be seen. In operation, the serializer 101 is able to generate a serialized signal for transmission across channel 104 with transmitter 103 (which can include a buffer 102). As a signal x[n] is transmitted across channel 104, an encoding scheme (which has transmit symbols) is employed. An example of an encoding scheme is a 2-level pulse amplitude modulation (2-PAM) scheme (which is referred to as non-return-to-zero or NRZ). For the NRZ scheme, the transmit symbols are −1 and +1. This transmitted signal y[t] is received by the receiver 105. This signal, however, is generally distorted by inter-symbol interference (ISI), so, after the signal is digitized by analog-to-digital converter (ADC) 106, the DFE loop 107 can compensate for the ISI.

In this configuration, the DFE loop 107 is continuously adaptive so as to adjust its feedback to compensate for ISI. To do this, the DFE loop employs an adder 108, comparison circuit 110, and a filter 112 (which is typically a finite impulse response or FIR filter). Generally, the DFE loop 107 (and the filter 112, in particular) uses post-cursor taps to perform this ISI compensation. In FIG. 2, an example of the effective link pulse response can be seen, where $h_0$ is the main cursor and $h_1$ and $h_2$ are post-cursor taps. In this example, samples of the received signal y[t] is as follows:

$$y[n]=h_0*x[n]+h_1*x[n-1]+h_2*x[n-2]+O, \quad (1)$$

where O is lower order interference (which is ignored in this example). Filter 112 is then able to generate the ISI expression:

$$h_1*x[n-1]+h_2*x[n-2] \quad (2)$$

When this ISI expression is subtracted from the signal y[n], the ISI is effectively compensated for. A problem with this configuration is that the speed of the DFE loop 107 is limited by the ability to calculate the ISI expression of equation (2) in one symbol period.

If an NRZ encoding scheme is (for example) employed, the calculations can be approximated. Since signal x[n] can be assumed to be ±1, then the ISI expression of equation (2) can be assumed to be:

$$h_1+h_2; \quad (3)$$

$$h_1-h_2; \quad (4)$$

$$-h_1+h_2; \text{ or} \quad (5)$$

$$-h_1-h_2. \quad (6)$$

Thus, DFE loop 107 can be replaced with DFE loop 203 in receiver 201 of SerDes link 200, as shown in FIG. 3. This is generally referred to as a speculative DFE. In this configuration, compensators 206-1 to 206-4 calculate equations (3) to (6) substantially simultaneously, and comparison results are determined by comparators 204-1 to 204-4. These comparison results are multiplexed by multiplexer or mux 208, where the select signal SELECT is calculated from signals x[n−1] and x[n−2].

The SerDes link 200, shown in FIG. 3, can be expanded so as to be employed with other encoding schemes (such as M-PAM) and with larger numbers of post-cursor taps. Some problems with this speculative DFE configuration, though, are complexity, power consumption, and area usage, which can largely be attributed to the number of comparators. As shown in FIG. 3, four comparators are employed, but for an M-PAM system the number of comparators is $M^N$, where M is the number of transmit symbols and N is the number of taps. For a 4-PAM system having 2 taps and 3 decision levels, there are 16 comparators per decision level and 48 total comparators (as can be seen in example of FIG. 4). Thus, there is a need for an improved DFE.

Some other conventional systems are: U.S. Pat. Nos. 7,539,243; 7,792,187; 7,822,114; U.S. Patent Pre-Grant Publ. No. 2008/0187036; U.S. Patent Pre-Grant Publ. No. 2009/0285277; U.S. Patent Pre-Grant Publ. No. 2009/0304066; U.S. Patent Pre-Grant Publ. No. 2010/0054324; and van Ierssel et al., "An Adaptive 4-PAM Decision-Feedback Equalizer for Chip-to-Chip Signaling," *IEEE Intl. SOC Conf. Proceedings*, 2004, Sep. 12-15, 2004, pp. 297-300.

SUMMARY

An embodiment of the present invention, accordingly, provides an apparatus. The apparatus comprises a transmitter having a transmit filter; a receiver having: an equalizer that is configured to receive a signal from the communication channel having at least one of a plurality of transmit symbols of an encoding scheme, wherein the equalizer and transmit filter are configured to adjust a set of taps in an equalization window so that the taps from the set are substantially equal to one another; and a decision feedback equalizer (DFE) loop that is coupled to the equalizer and that is configured to compensate for inter-symbol interference (ISI); and a channel that is coupled between the transmitter and receiver.

In accordance with an embodiment of the present invention, the DFE loop further comprises: an analog-to-digital converter (ADC) that is coupled to the equalizer; a set of difference circuits that generate a set of difference signals, wherein each difference circuit is coupled to the ADC, and wherein each difference circuit calculates at least one of difference signals by employing at least one of the taps; and a set of comparators, wherein each comparator is coupled to at least one of the difference circuits.

In accordance with an embodiment of the present invention, the transmit filter is a finite impulse response (FIR) filter.

In accordance with an embodiment of the present invention, the DFE loop further comprises a multiplexer that is coupled to each comparator from the set of comparators.

In accordance with an embodiment of the present invention, the encoding scheme is non-return zero (NRZ), and wherein the number of taps is 2, and wherein the number of comparators is 3.

In accordance with an embodiment of the present invention, the encoding scheme is M-level pulse amplitude modulation (M-PAM), and wherein the number of taps is N, and wherein the number of comparators is $[N*(M-1)+1]*(M-1)$.

In accordance with an embodiment of the present invention, the FIR filter shapes the main cursor of the pulse response to merge the comparator levels from adjacent M-PAM decision levels such that the minimum number of comparators is $[N*(M-1)+1]*(M-1)-N*(M-1)*(M-2)/2$.

In accordance with an embodiment of the present invention, a method is provided. The method comprises filtering a signal to generate a filtered signal; transmitting the filtered signal over a channel using an encoding scheme so that a transmitted signal is received by a receiver, wherein the encoding scheme has a plurality of transmit symbols; equalizing the transmitted signal to generate an equalized signal, wherein the steps of equalizing and filtering adjust a set of taps in an equalization window so that the taps from the set are substantially equal to one another; and compensating for ISI in the equalized signal.

In accordance with an embodiment of the present invention, the step of filtering further comprises applying a FIR filter.

In accordance with an embodiment of the present invention, the step of compensating further comprises: digitizing the equalized signal to generate a digitized signal; computing a plurality of difference signals from the digitized signal using the set of taps; performing a plurality of comparisons with the plurality of difference signals to generate a plurality of comparison results; and multiplexing the plurality of comparison results.

In accordance with an embodiment of the present invention, the step of filtering further comprises shaping the effective pulse response to merge the comparator levels from adjacent M-PAM decision levels such that the minimum number of comparisons is $[N*(M-1)+1)]*(M-1)-N*(M-1)*(M-2)/2$.

In accordance with an embodiment of the present invention, a serializer/deserializer (SerDes) link is provided. The SerDes links comprises a serializer; a transmitter that is coupled to the serializer, wherein the transmitter has a transmit filter; a receiver having: an equalizer that is configured to receive a signal from the communication channel having at least one of a plurality of transmit symbols of an encoding scheme, wherein the equalizer and transmit filter are configured to adjust a set of taps in an equalization window so that the taps from the set are substantially equal to one another; and a decision feedback equalizer (DFE) loop that is coupled to the equalizer and that is configured to compensate for inter-symbol interference (ISI); a channel that is coupled between the transmitter and receiver; and a deserializer that is coupled the DFE loop.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
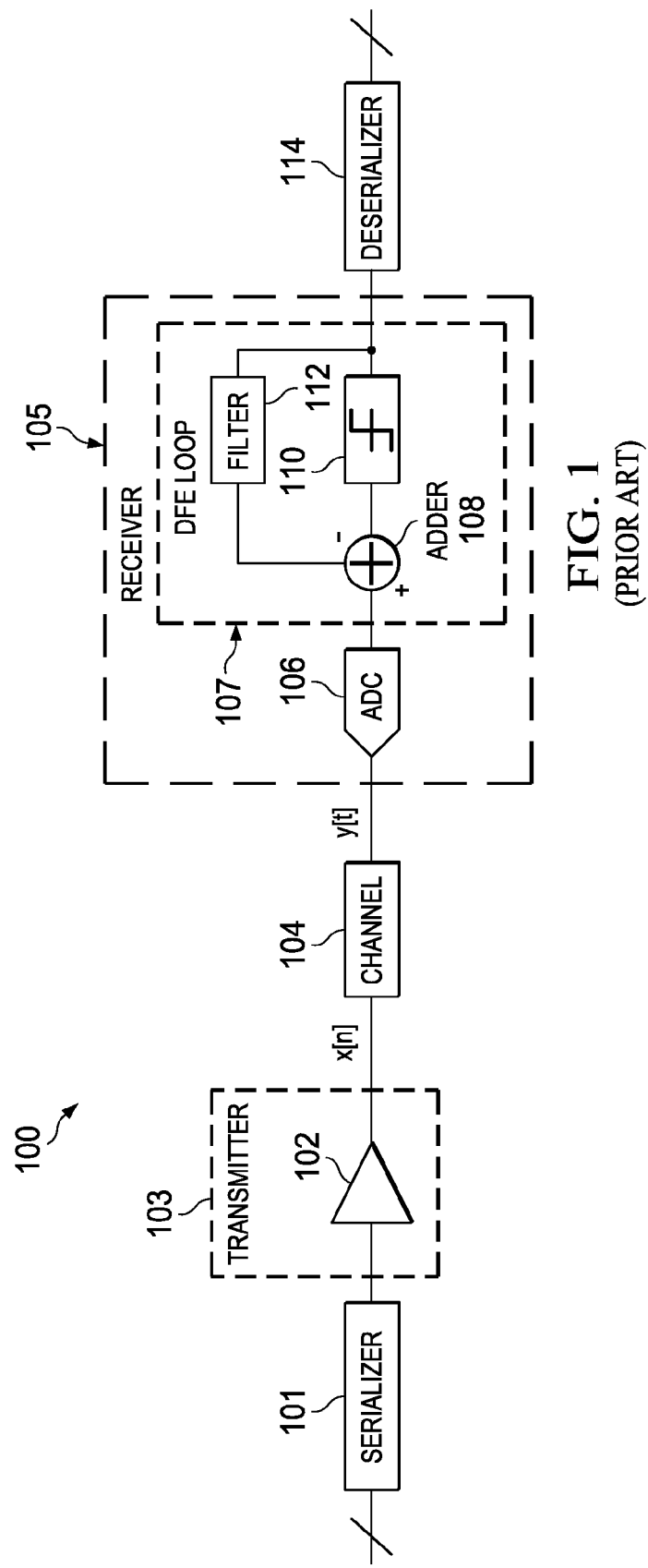
FIG. 1 is a diagram of a conventional SerDes link.
Figure 2:
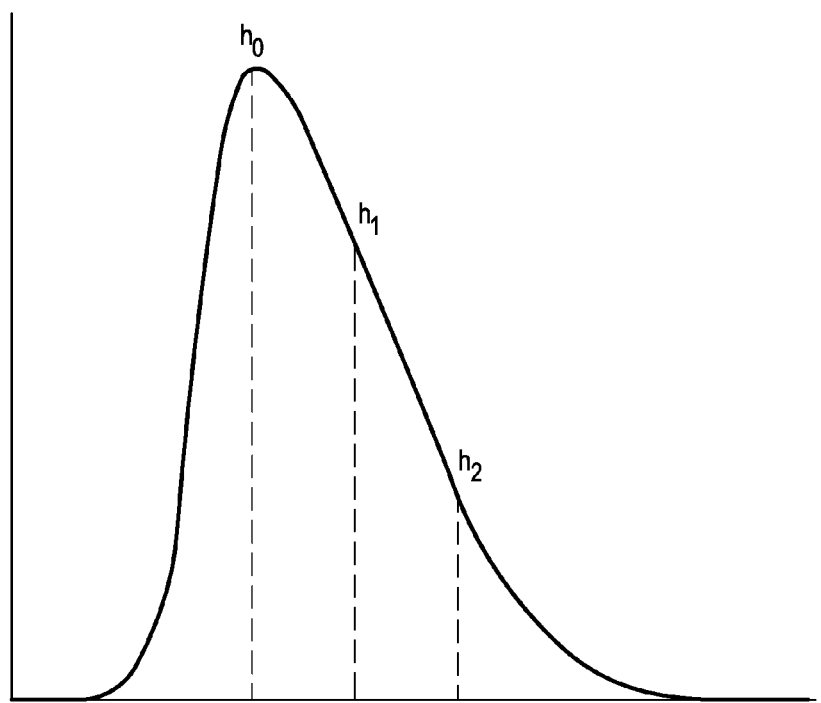
FIG. 2 is a diagram of a signal input to the receiver of FIG. 1.

Refer now to the drawings wherein depicted elements are, for the sake of clarity, not necessarily shown to scale and wherein like or similar elements are designated by the same reference numeral through the several views.

Figure 4:
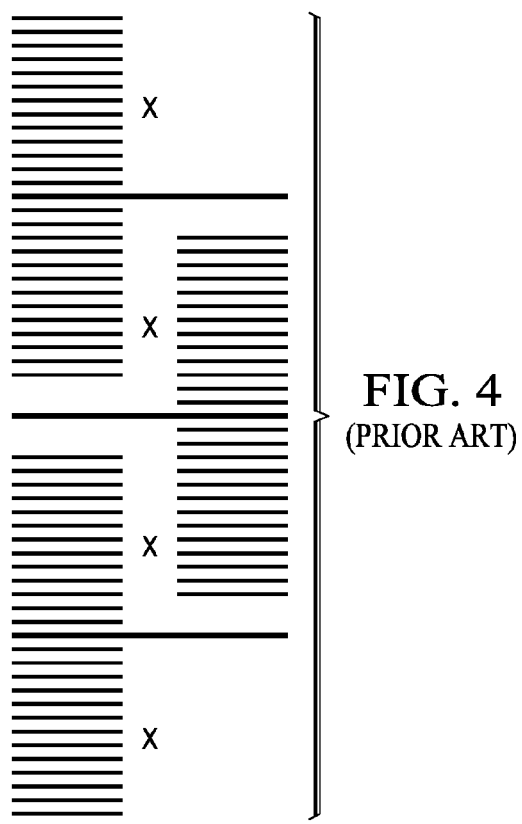
FIG. 4 is a diagram shown comparators levels for a 4-PAM system using the SerDes link of FIG. 3.
Figure 3:
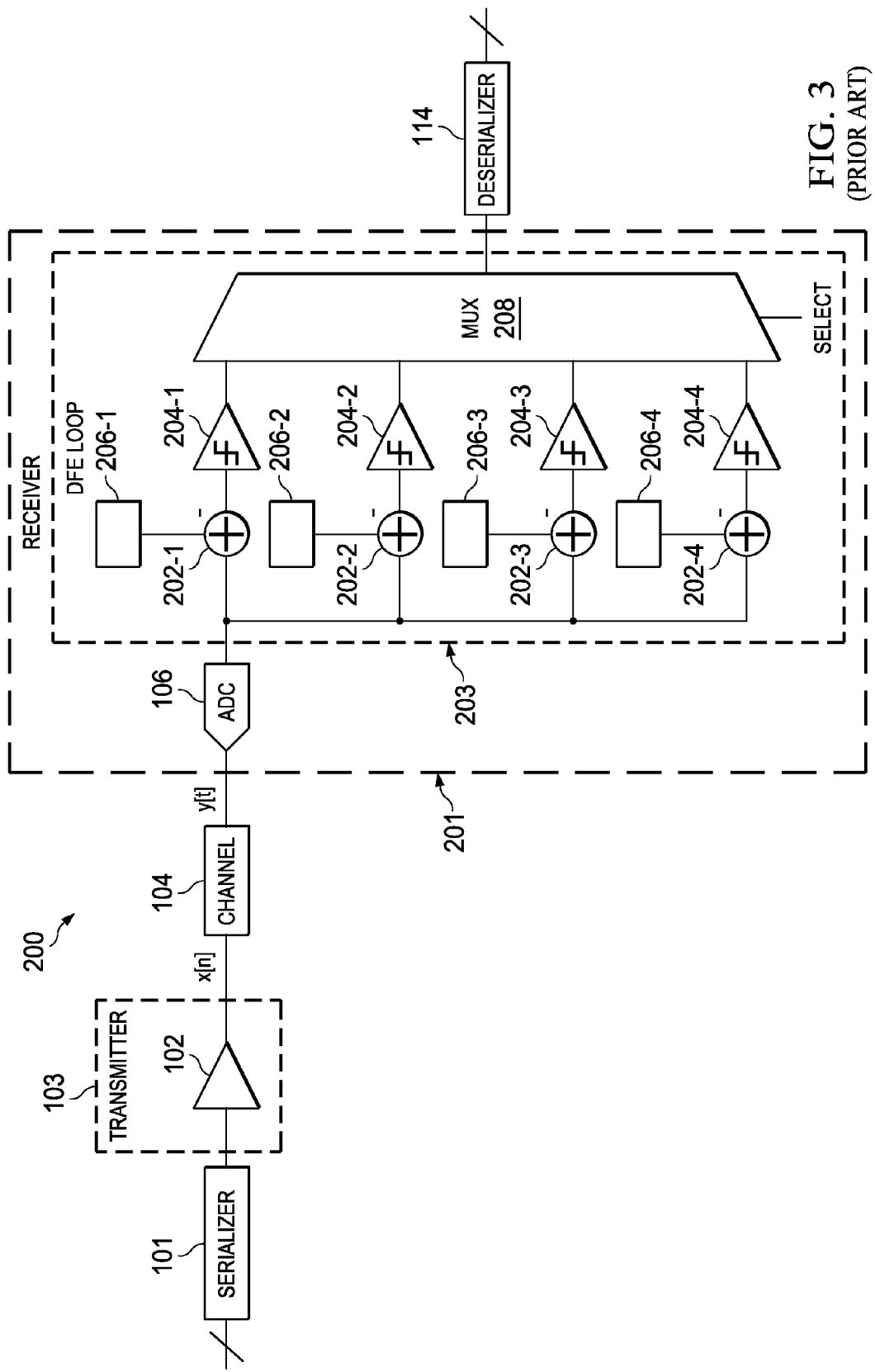
FIG. 3 is a diagram of a conventional SerDes link employing a speculative DFE.
Figure 5:
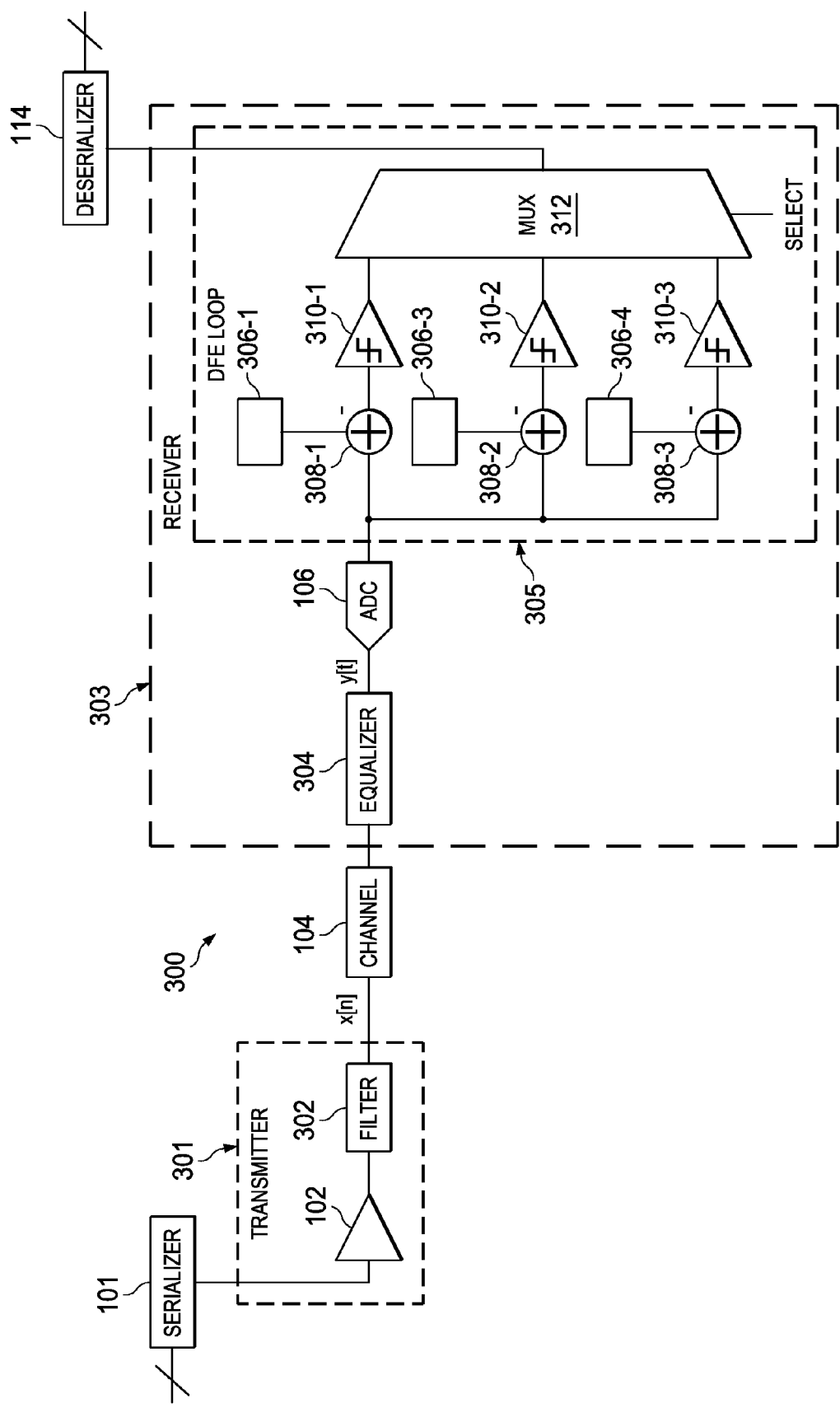
FIG. 5 is a diagram of an example of a SerDes link in accordance with an embodiment of the present invention.

Looking back to FIG. 4, as an example, there are multiple overlapping levels, so it is possible to eliminate redundancies or degeneracies. Turning to FIG. 5, a diagram of an example of a SerDes link 300 in accordance with an embodiment of the present invention can be seen. For the sake of simplicity, the SerDes link 300 employs an NRZ encoding scheme, but the same configuration can be applied to other schemes, such as M-PAM. For SerDes link 300, an equalizer 304 (which is typically an analog equalizer) and a transmit filter 302 (which is typically a FIR filter) are inserted in the receiver 303 and transmitter 301, respectively. The equalizer 304 and filter 302 are able to force (at least some of) the post-cursor taps to be equal to one another. For example, if DFE loop 303 has 2 taps (i.e., $h_1$ and $h_2$) can be forced to be equal to one another (i.e., $h_1=h_2=h$), allowing equations (3) through (6) to become 2h, 0, and −2h.

Figure 6:
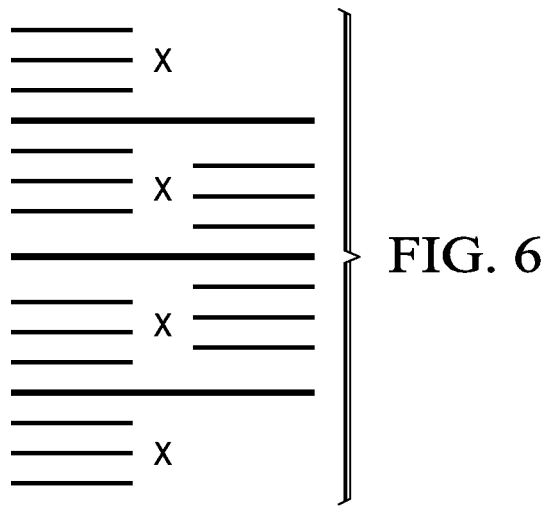
FIGS. 6 and 7 are diagrams showing example comparator levels for the SerDes link of FIG. 5.

Effectively, by doing this, the number of comparators for an M-PAM (for example) with N taps is reduced to:

$$[N*(M-1)+1]*(M-1) \qquad (7)$$

from $M^N$ with SerDes link 200. So, for the example shown in FIG. 5 (which uses an NRZ encoding scheme with 2 taps and has 2*(2−1)+1=3 comparators), comparators 310-1 to 310-3 are employed with difference circuits (which generally adders 308-1 to 308-1 and compensators 306-1 to 306-3) and multiplexer 312. For the example shown in FIG. 6 (which is a 4-PAM system having 2 taps and 3 comparator levels similar to that shown in FIG. 4), the number of comparators is 3*(2*(4−1)+1)=21.

Figure 7:
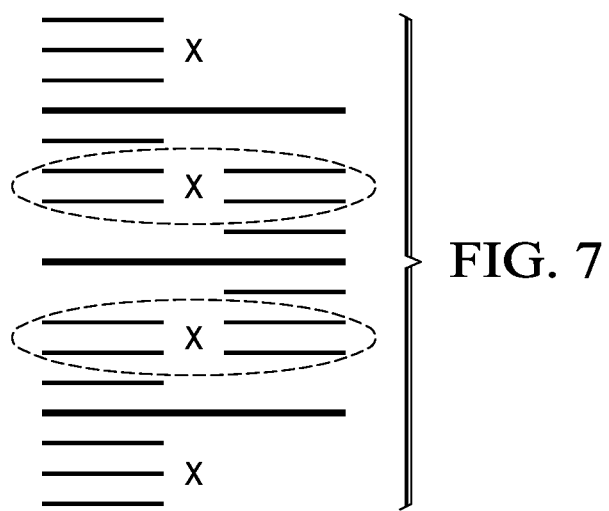

To further reduce the number of comparators, the main cursor of the pulse response or $h_0$ can be modified by transmit filter 302 to eliminate other seemingly degenerate comparator levels, as shown in the example of FIG. 7. For example, if the main cursor of the pulse response or $h_0$ is forced to be equal to ¼ of the post-cursor taps (i.e., $h_0=h/4$) for a 4-PAM system with 2 taps and 3 comparator levels, the number of comparators can be reduced to 15. Specifically, for an M-PAM system with N taps the minimum number of comparators is:

$$[N*(M-1)+1)]*(M-1)-N*(M-1)*(M-2)/2. \qquad (8)$$

Thus, the complexity of SerDes link 300 can be further reduced.

Transmission encoding can be employed as yet another feature to reduce the complexity of SerDes link 300. With transmission encoding, enumerated transmission bit sequences are used so that certain ISI levels (or comparators) will be exercised. This can further help to reduce the number of comparators since certain ISI levels are exercised. As an example, an NRZ encoding scheme can include "run length" transmission encoding, where the sequences "100" and "011" are prevented. By using the "run length" transmission encoding with the NRZ encoding scheme, the levels 2*h and −2*h can be omitted as the level at "0" would be only level used.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
   a transmitter having a transmit filter;
   a receiver having:
      an equalizer that is configured to receive a signal from a communication channel having at least one of a plurality of transmit symbols of an encoding scheme, wherein the equalizer and transmit filter are configured to adjust a set of taps in an equalization window so that the taps from the set are substantially equal to one another; and
      a decision feedback equalizer (DFE) loop that is coupled to the equalizer and that is configured to compensate for inter-symbol interference (ISI); and
   a channel that is coupled between the transmitter and receiver.

2. The apparatus of claim 1, wherein the DFE loop further comprises:
   an analog-to-digital converter (ADC) that is coupled to the equalizer;
   a set of difference circuits that generate a set of difference signals, wherein each difference circuit is coupled to the ADC, and wherein each difference circuit calculates at least one of difference signals by employing at least one of the taps; and
   a set of comparators, wherein each comparator is coupled to at least one of the difference circuits.

3. The apparatus of claim 2, wherein the transmit filter is a finite impulse response (FIR) filter.

4. The apparatus of claim 3, wherein the DFE loop further comprises a multiplexer that is coupled to each comparator from the set of comparators.

5. The apparatus of claim 4, wherein the encoding scheme is non-return zero (NRZ), and wherein the number of taps is 2, and wherein the number of comparators is 3.

6. The apparatus of claim 4, wherein the encoding scheme is M-level pulse amplitude modulation (M-PAM), and wherein the number of taps is N, and wherein the number of comparators is $[N*(M-1)+1]*(M-1)$.

7. The apparatus of claim 6, wherein the FIR filter shapes a main cursor of a pulse response to merge the comparator levels from adjacent M-PAM decision levels such that a minimum number of comparators is $[N*(M-1)+1]*(M-1)-N*(M-1)*(M-2)/2$.

8. An method comprising:
   filtering a signal to generate a filtered signal;
   transmitting the filtered signal over a channel using an encoding scheme so that a transmitted signal is received by a receiver, wherein the encoding scheme has a plurality of transmit symbols;
   equalizing the transmitted signal to generate an equalized signal, wherein the steps of equalizing and filtering adjust a set of taps in an equalization window so that the taps from the set are substantially equal to one another; and
   compensating for ISI in the equalized signal.

9. The method of claim 8, wherein the step of filtering further comprises applying a FIR filter.

10. The method of claim 9, wherein the step of compensating further comprises:
    digitizing the equalized signal to generate a digitized signal;
    computing a plurality of difference signals from the digitized signal using the set of taps;
    performing a plurality of comparisons with the plurality of difference signals to generate a plurality of comparison results; and
    multiplexing the plurality of comparison results.

11. The method of claim 10, wherein the encoding scheme is M-PAM, and wherein the number of taps is N, and wherein the number of comparisons is $[N*(M-1)+1]*(M-1)$.

12. The method of claim 11, wherein the step of filtering further comprises shaping a main cursor of a pulse response to merge the comparator levels from adjacent M-PAM decision levels such that a minimum number of comparisons is $[N*(M-1)+1]*(M-1)-N*(M-1)*(M-2)/2$.

13. A serializer/deserializer (SerDes) link comprising:
    a serializer;
    a transmitter that is coupled to the serializer, wherein the transmitter has a transmit filter;
    a receiver having:
       an equalizer that is configured to receive a signal from a communication channel having at least one of a plurality of transmit symbols of an encoding scheme, wherein the equalizer and transmit filter are configured to adjust a set of taps in an equalization window so that the taps from the set are substantially equal to one another; and
       a decision feedback equalizer (DFE) loop that is coupled to the equalizer and that is configured to compensate for inter-symbol interference (ISI);
    a channel that is coupled between the transmitter and receiver; and
    a deserializer that is coupled the DFE loop.

14. The SerDes link of claim 13, wherein the DFE loop further comprises:
    an analog-to-digital converter (ADC) that is coupled to the equalizer;
    a set of difference circuits that generate a set of difference signals, wherein each difference circuit is coupled to the ADC, and wherein each difference circuit calculates at least one of difference signals by employing at least one of the taps; and
    a set of comparators, wherein each comparator is coupled to at least one of the difference circuits.

15. The SerDes link of claim 14, wherein the transmit filter is a finite impulse response (FIR) filter.

16. The SerDes link of claim 15, wherein the DFE loop further comprises a multiplexer that is coupled to each comparator from the set of comparators.

17. The SerDes link of claim 16, wherein the encoding scheme is non-return zero (NRZ), and wherein the number of taps is 2, and wherein the number of comparators is 3.

18. The SerDes link of claim 16, wherein the encoding scheme is M-level pulse amplitude modulation (M-PAM), and wherein the number of taps is N, and wherein the number of comparators is $[N*(M-1)+1]*(M-1)$.

19. The SerDes link of claim 18, wherein the FIR filter shapes a main cursor of a pulse response to merge the comparator levels from adjacent M-PAM decision levels such that a minimum number of comparators is $[N*(M-1)+1]*(M-1)-N*(M-1)*(M-2)/2.0$.

* * * * *